(No Model.) 3 Sheets—Sheet 1.
J. G. BAILEY.
HARROW AND CULTIVATOR.
No. 358,321. Patented Feb. 22, 1887.
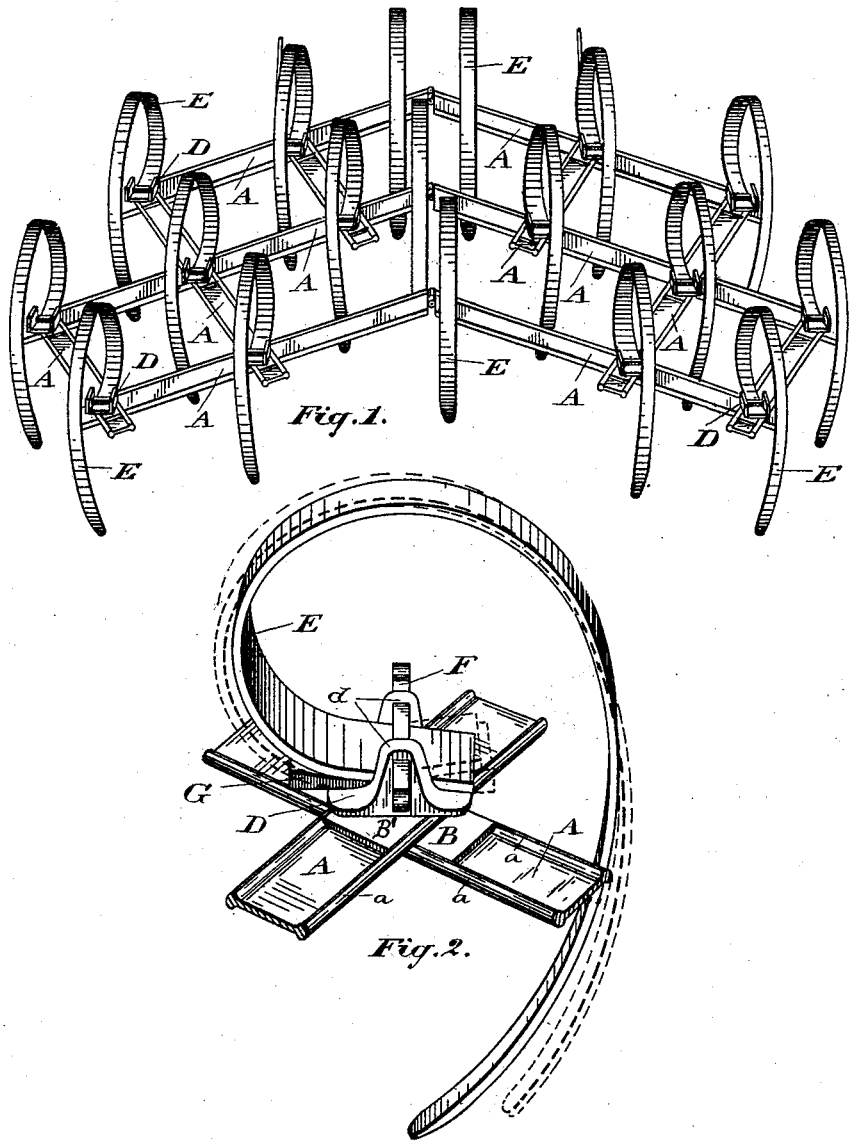
Witnesses. Inventor.

(No Model.) 3 Sheets—Sheet 2.

J. G. BAILEY.
HARROW AND CULTIVATOR.

No. 358,321. Patented Feb. 22, 1887.

Witnesses. Inventor.

(No Model.) 3 Sheets—Sheet 3.

J. G. BAILEY.
HARROW AND CULTIVATOR.

No. 358,321. Patented Feb. 22, 1887.

Witnesses.
James L. Maylin
J. M. Jackson

Inventor.
J. G. Bailey
by Donald C. Ridout
Atty

UNITED STATES PATENT OFFICE.

JAMES G. BAILEY, OF RICHMOND HILL, ONTARIO, CANADA.

HARROW AND CULTIVATOR.

SPECIFICATION forming part of Letters Patent No. 358,321, dated February 22, 1887.

Application filed July 21, 1886. Serial No. 208,672. (No model.)

*To all whom it may concern:*

Be it known that I, JAMES GAGE BAILEY, of the village of Richmond Hill, in the county of York, in the Province of Ontario, Canada, have invented certain new and useful Improvements in Harrows and Cultivators, of which the following is a specification.

The object of the invention is, first, to design a light metal frame possessing the necessary rigidity to render it serviceable as a cultivator or harrow frame; secondly, to devise simple means for attaching the teeth to the said frame; and it consists, first, in providing a bar-metal frame, preferably of light steel, with angle or T shaped edges, being connected to the said frame by peculiarly-shaped blocks, together with bolts or keys, arranged substantially as hereinafter described.

Figure 3:
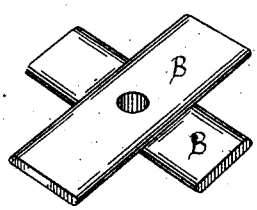
Figure 7:
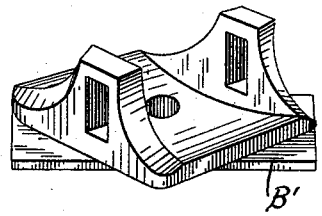
Figure 6:
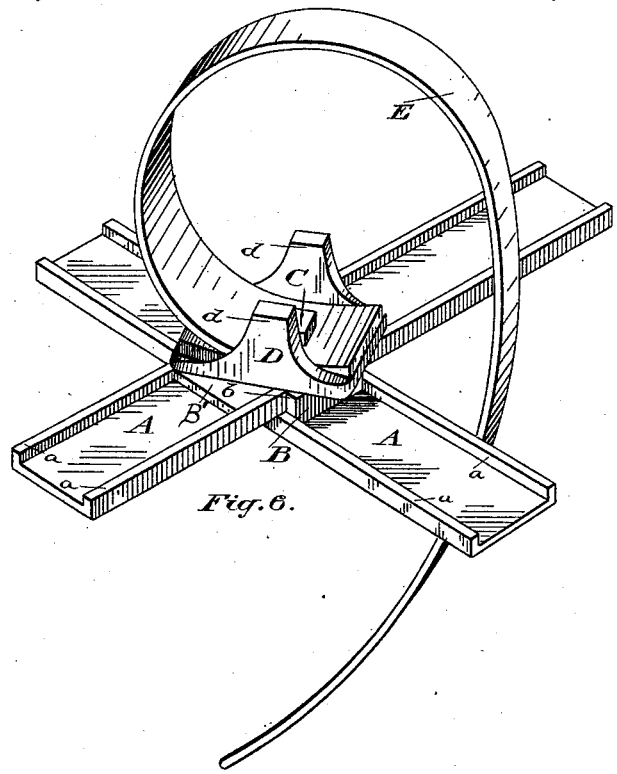
Figure 4:
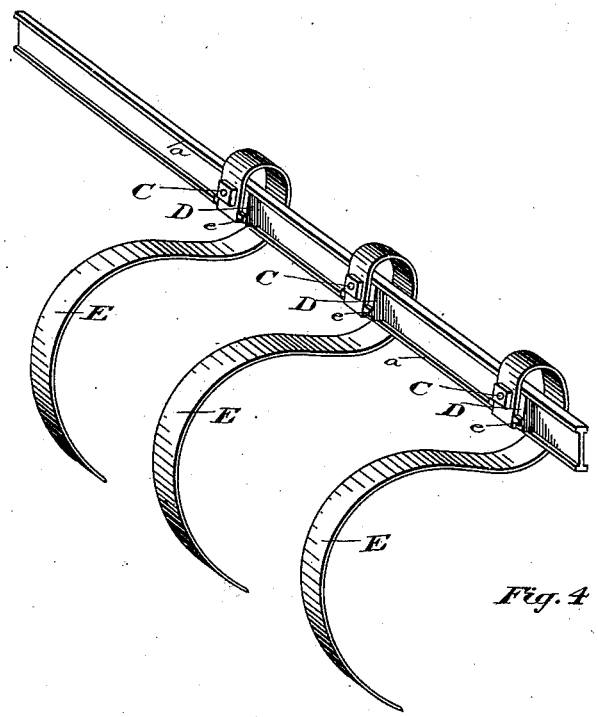
Figure 5:
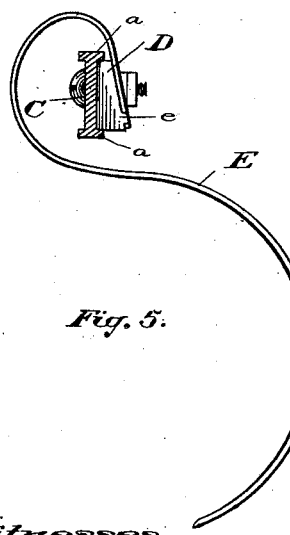

Figure 1 is a view of the harrow with my improved metal frame and teeth secured in position in accordance with my invention. Fig. 2 is an enlarged perspective detail showing the manner of securing the teeth to the frame. Fig. 3 is a perspective detail of a cross-block for connecting the bars of the frame together. Fig. 4 is a perspective detail of the three teeth of a cultivator attached in accordance with my invention to my improved metal frame. Fig. 5 is a cross-section of the frame next to one of the teeth. Fig. 6 is a detail showing an alternative form of metal bar for frame. Fig. 7 is a detail of the tooth-saddle.

It will be noticed that the frame consists of light metal bars rolled with their edges raised above their center portion, preferably forming a double T-shaped bar; but instead of the double T-shaped bar an angle-bar, as shown in Fig. 6, would, in a measure, answer the purpose of my invention.

Between the lips *a*, forming the edges of the T or angle shaped bars A, I insert a metal block, which, when used in connection with a harrow-frame, is formed like a double block, B, as shown in Fig. 3, and the block thus shaped like B is inserted between the lips *a* on the frame A at the point where the bars cross each other, one portion of the block B fitting between the lips *a* on the bottom side of the frame A, while the other portion of the block B, which is set at right angles to its upper portion, fits between the lips *a* on the top side of the frame A. A bolt, C, passing through the saddle D, both bars of the frame A, and through the block B, secures them together, as shown.

Should the bars of the frame A be made the shape shown in Fig. 6, the block B, instead of fitting between the lips *a* and the frame A, would have lips *b* formed on the said block, to catch the crossing bars of the frame A, as indicated in Fig. 6.

When the tooth is to be applied to the frame A, I attach the saddle D at the point indicated in the drawings, and either carry the bolt C through a hole in the said saddle and through a hole in the tooth E, as shown in Fig. 7, or I simply bolt the saddle D in position and place the tooth E on the said saddle between the jaws *d*. I slip a key, F, through holes in the jaws *d*, as indicated in Fig. 2, and by tightening said key F, I rigidly secure the tooth E in the desired position.

In Fig. 2 I show a detachable wedge, G, which I use for the purpose of changing the angle of the tooth E. When the wedge G is placed in the position indicated in full lines in Fig. 2, the point of the tooth E is thrown down, and by placing it on the opposite side of the saddle D (indicated by dotted lines in Fig. 2) it is thrown up.

Instead of providing a detachable wedge, G, the bottom of the saddle D may be slanted or made wedge-shaped, as indicated in Fig. 7. With this improvement it is merely necessary to reverse the saddle D when it is desired to alter the angle of the tooth. When my invention is to be applied to a cultivator, I change the shape of the saddle D from that shown in Figs. 2 and 7 to the styles shown in Figs. 4 and 5. In this latter style the saddle D is merely a bevel-block fitted between the lips *a* and provided with lips *e*, to fit against each edge of the tooth E and prevent the said tooth, when placed in position, as indicated in Fig. 4, from twisting on its bolt C, which passes through the frame, block, and tooth. When a block of this description is employed, the angle of the tooth is altered by simply reversing the block, and consequently the angle of the said tooth E may be altered, as in the other form of construction, without introducing an oblong bolt-hole through the tooth.

In order to give rigidity to the saddle and prevent its turning, I provide the block B', which fits between the lips a a of the bars A, as shown in Figs. 2 and 6, though this block B' is not absolutely necessary, and may sometimes be omitted.

What I claim as my invention is—

1. A cultivator or harrow frame composed of light metal bars A, having lips a formed on their edges, in combination with blocks B, fitted between the lips of said bars at their points of intersection, and bolts C, substantially as and for the purpose specified.

2. The frame or bar A, having lips a formed on its edges, in combination with the blocks B and a beveled block or saddle fitted between the lips a, and forming a seat for the tooth E, which is secured by the bolt C, substantially as and for the purpose specified.

3. The frame or bar A, having lips a formed on its edges, between which the block or saddle D is placed, in combination with the tooth E, fitting between the lips d, formed on the saddle D, and means for binding them together, substantially as and for the purpose specified.

4. The bar or frame A, having lips a formed on its edges, in combination with the saddle D, having the bottom shaped to fit between the said lips a, and the tooth E, fitted between the jaws d on the saddle D and rigidly secured by means of the key F, substantially as and for the purpose specified.

5. The frame or bar A, having lips a formed on its edges, between which the bottom of the saddle D fits, in combination with the wedge G, either detachable or solid with the saddle, and forming a seat for the tooth E, which is secured in position by the key F, substantially as and for the purpose specified.

Richmond Hill, July 6, 1886.

JAMES G. BAILEY.

In presence of—
 M. LEEFY,
 W. McINTOSH.